INVENTORS:
JOHN W. MAUCHLY
JOHN PRESPER ECKERT JR.
ATTORNEY

INVENTORS:
JOHN W. MAUCHLY
JOHN PRESPER ECKERT JR.
ATTORNEY

Patented June 17, 1952

2,600,744

UNITED STATES PATENT OFFICE 2,600,744

SIGNAL RESPONSIVE APPARATUS

John Presper Eckert, Jr., Gladwyne, and John W. Mauchly, Ambler, Pa., assignors to Eckert-Mauchly Computer Corporation, Philadelphia, Pa., a corporation of Pennsylvania Application October 21, 1950, Serial No. 191,401

11 Claims. (Cl. 250—27)

This invention relates to apparatus jointly responsive to impulse groups arriving over a plurality of channels and more particularly to an impulse responsive network of the type delivering at its output a signal reflecting properties present in all its input channels.

This invention provides an apparatus responsive to impulses or trains of impulses which arrive over a plurality of channels. The apparatus does not respond to each impulse individually, but to each group of impulses delivered concurrently by the several channels. The output impulse or impulses produced by the apparatus is determined by the energizing impulse group. In this way, the apparatus produces a response which is a signal impulse or train of impulses uniquely reflecting the properties of the impulses or trains of impulses arriving over the signal channels.

Accordingly, it is a principal object of the invention to provide a new and improved impulse responsive circuit.

Another object of the invention is to provide a new and improved circuit responsive to signal impulse groups made up of impulses concurrently arriving over a plurality of signal channels.

Yet another object of the invention is to provide a new and improved circuit for producing unique output signals or impulse trains in response to energizing impulse groups.

Still another object of the invention is to provide an impulse responsive circuit delivering timed output impulses or trains of impulses.

A further object of the invention is to provide a new and improved like-unlike response circuit for comparing signal impulses or trains of impulses.

Yet a further object of the invention is to provide a new and improved circuit for inverting impulse trains.

Another object of the invention is to provide an impulse responsive circuit having high reliability and accuracy of response.

Yet another object of the invention is to provide an impulse responsive circuit permitting arbitrary suppression of its output signals.

Figure 1:
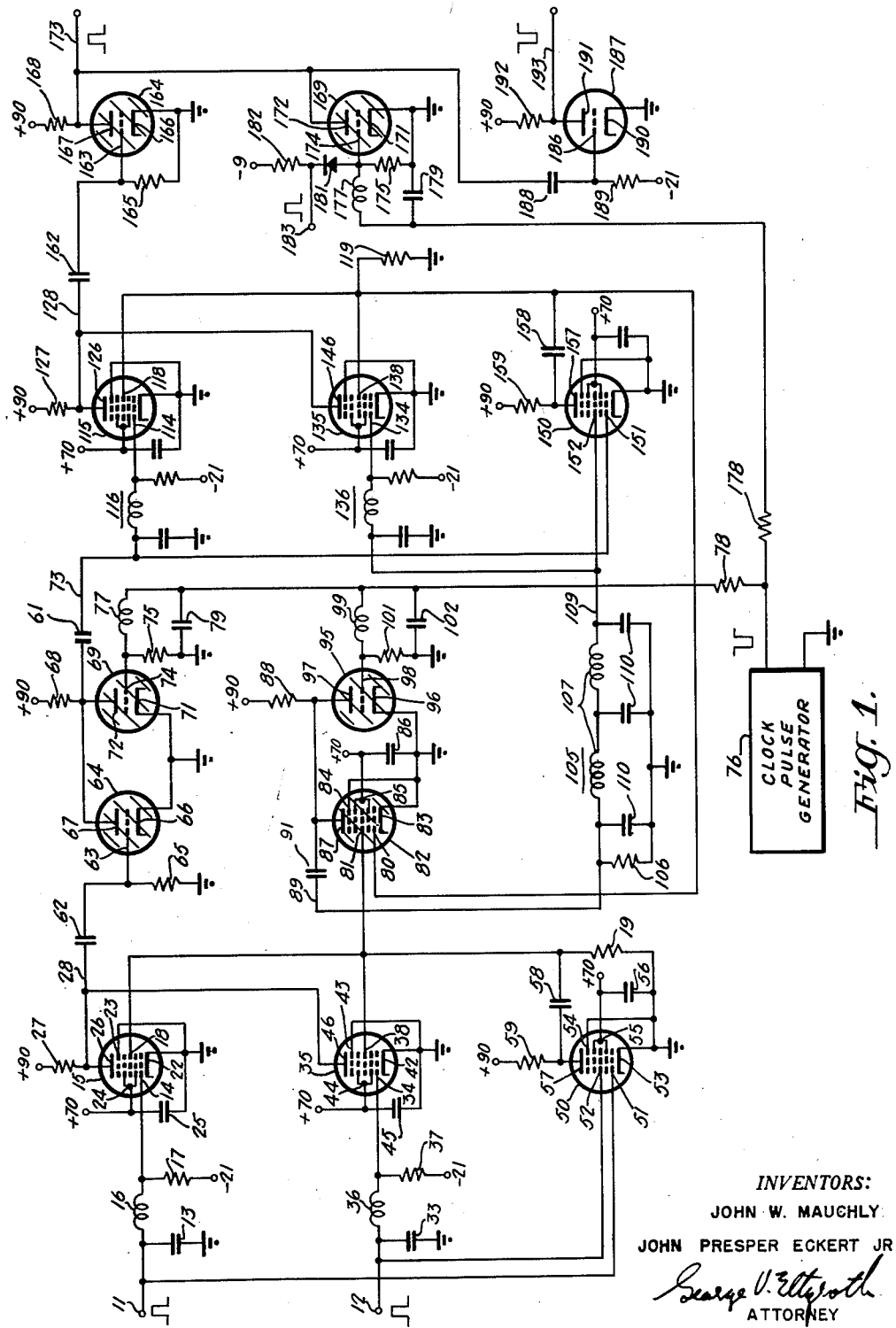
Figure 2:
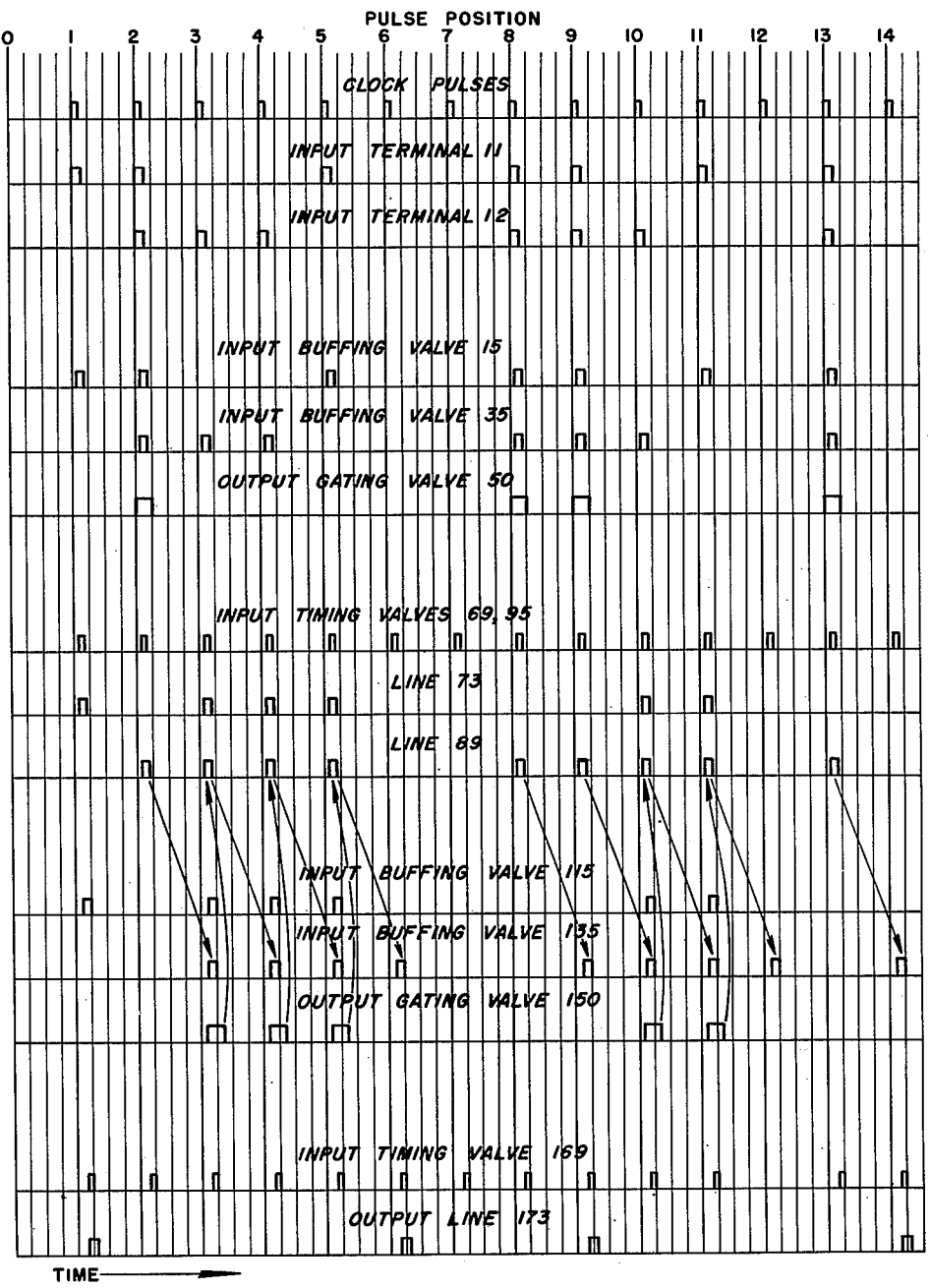
Figure 3:
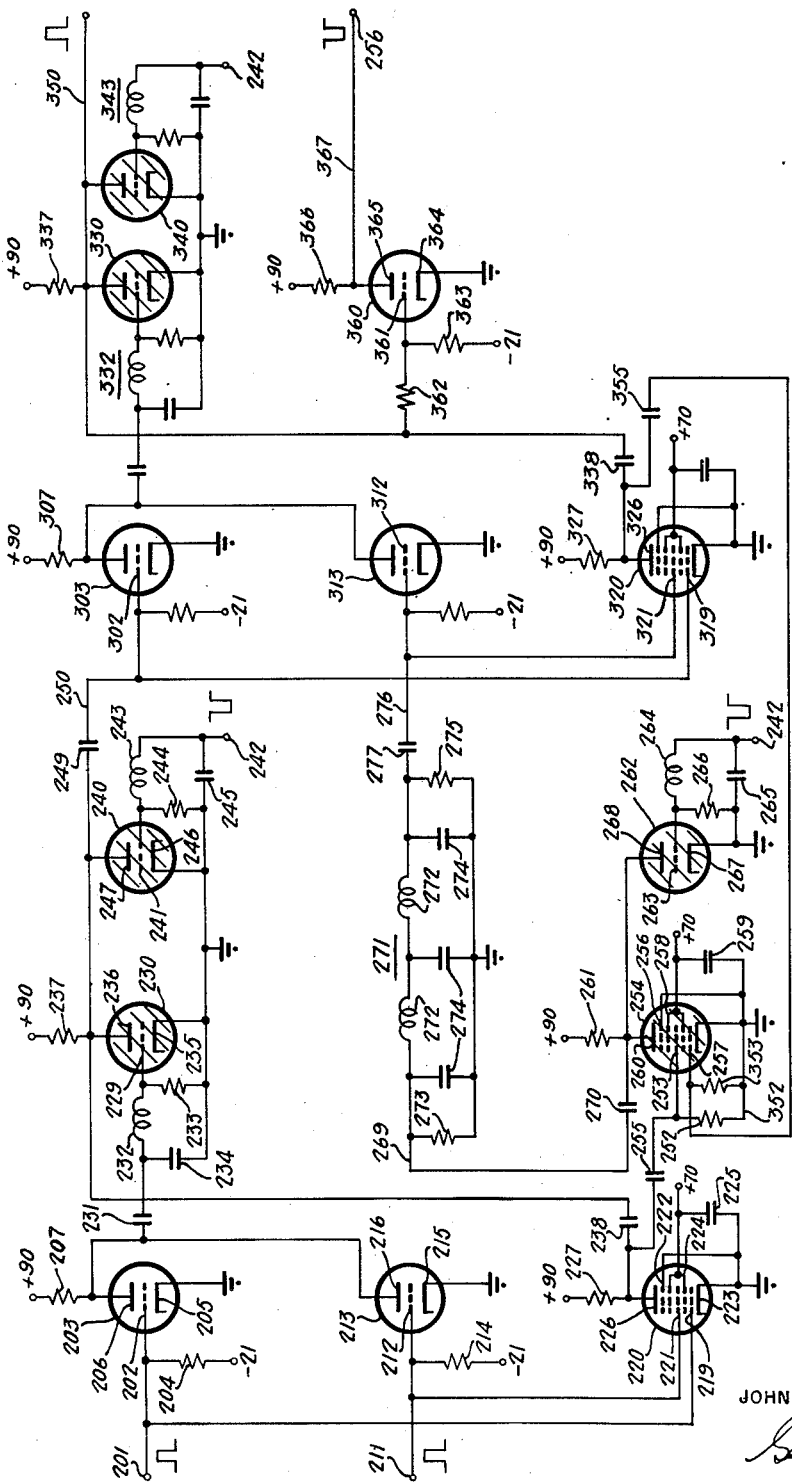
Figure 4:
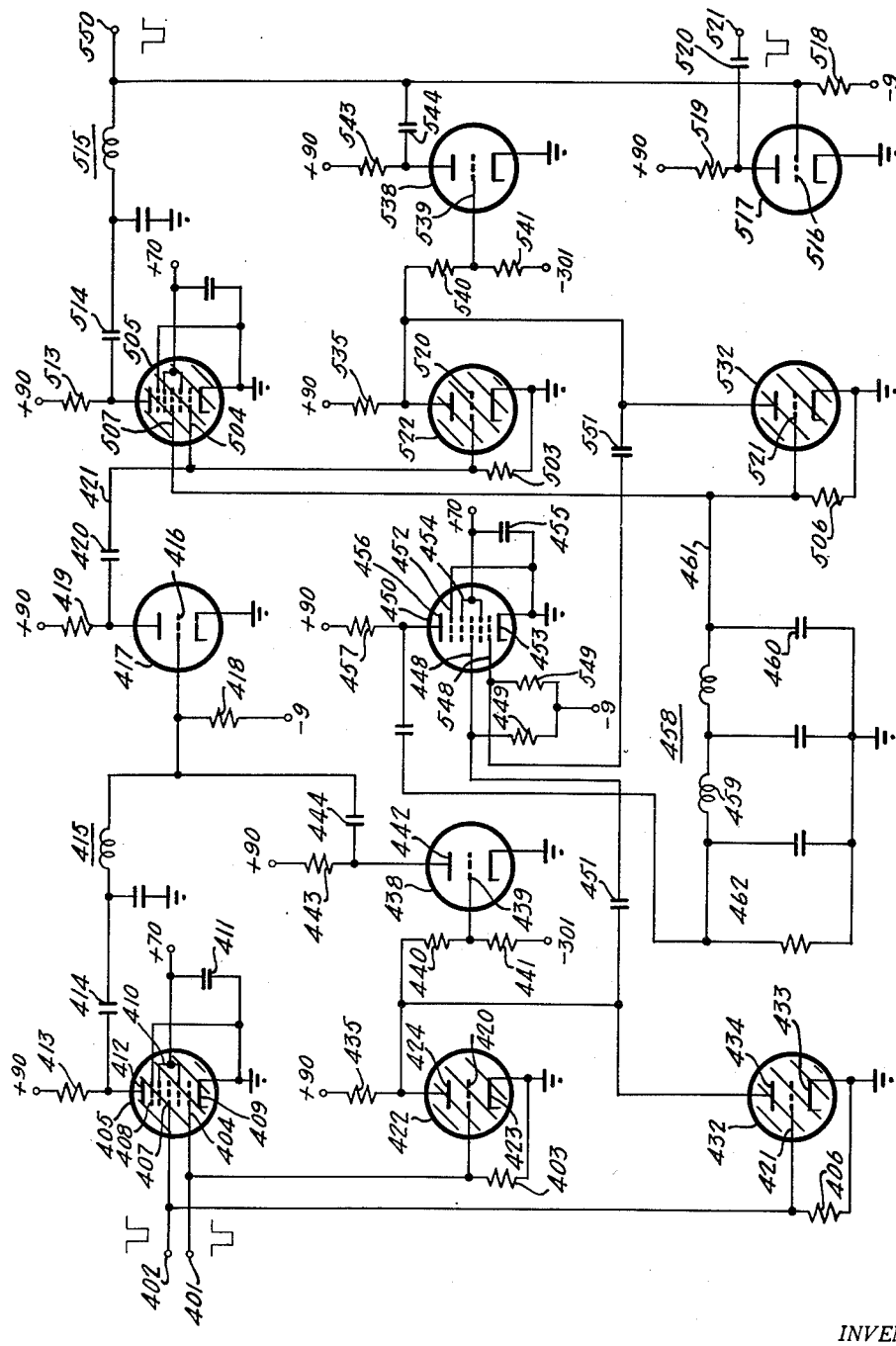

The foregoing and other objects of the invention will become more apparent as the following detailed description of the invention is read in conjunction with the drawings in which:

Figure 1 illustrates schematically a two-stage impulse responsive circuit embodying the invention, Figure 2 is a timing diagram illustrating the signals found at selected locations in the circuit shown in Figure 1, Figure 3 illustrates schematically a modified two-stage impulse responsive circuit embodying the invention, and Figure 4 illustrates schematically another two-stage impulse responsive circuit adapted to receive negative impulses.

In the annexed drawings like parts are identified by like reference characters and values of potential are given for purposes of illustration only and not in order to limit the scope of the invention.

For convenient reference, all supply buses are identified with a number corresponding with their voltage, even numbers being employed for positive voltages, and odd numbers for negative voltages.

Referring to Figure 1, numeral 11 designates an impulse receiving terminal. Terminal 11 may receive impulse trains having a predetermined repetition rate which are characterized by the presence or absence of a positive-going impulse in given impulse positions. Likewise, an impulse receiving terminal 12 may receive an impulse train of the same repetition rate also characterized by the absence or presence of a positive-going impulse in given impulse positions. Although different impulse trains may be received by the terminals 11 and 12, respectively, corresponding impulses should appear simultaneously and have equal durations.

Impulse receiving terminal 11 is returned to ground potential through a capacitor 13 and linked to the inner control electrode 14 of a buffing valve 15 through an inductor 16. The electrode 14 is negatively biased by its return to negative bus 21 by a grid resistor 17. The normally nonconducting buffer valve 15 is of conventional type commercially known as 6L7. The buffing valve 15 has its auxiliary control electrode 18 returned to ground through a resistor 19, and its cathode 22 and suppressor electrode 23 directly linked to ground potential, while its screen electrode 24 is linked to positive bus 70 and returned to ground through a bypass capacitor 25. The anode 26 of the buffing valve 15 is returned to positive bus 90 through an anode resistor 27.

The circuit which connects to impulse receiving terminal 12 is similar to the circuit connecting to impulse receiving terminal 11. A bypass capacitor 33 is bridged between the terminal 12 and ground, while an inductor 36 links terminal 12 with the inner control electrode 34 of a buffing valve 35. The buffing valve 35 which is normally nonconducting has its inner control electrode 34 returned to negative bus 21 through a grid resistor 37. The auxiliary control electrode 38 of buffing valve 35 is returned to ground potential through the resistor 19; the cathode 42 and suppressor electrode 43 are directly linked to ground potential; and the screen electrode 44 is joined to positive bus 70 and returned to ground potential through a bypass capacitor 45. The anode 46 of buffing valve 35 is joined to the anode 26 of buffing valve 15.

A conventional type gating valve 50 which is normally nonconducting has its inner control electrode 51 joined to the impulse receiving terminal 11, its auxiliary control electrode 52 linked to the impulse receiving terminal 12, and its cathode 53 and suppressor electrode 54 returned to ground potential. The screen electrode 55 of gating valve 50 is connected to positive bus 70 and returned to ground through a bypass capacitor 56 while the anode 57 is returned to positive bus 90 through the anode resistor 59 and further joined by means of a coupling capacitor 58 to the auxiliary control electrodes 18 and 38, respectively, of the buffing valves 15 and 35.

A positive impulse passing from impulse receiving terminal 11 to the inner control electrode 14 of the buffing valve 15 is delayed by the network comprising capacitor 13 and inductor 16. When received the current surge resulting through the anode circuit of buffer valve 15 develops a negative-going signal on its anode 26. This signal is delivered to the output line 28. With the removal of a positive signal impulse from the inner control electrode 14, the buffing valve 15 resumes its normal nonconductive state.

In a like manner, a positive impulse arriving from the impulse receiving terminal 12 is delivered to the inner control electrode 34 of the buffing valve 35 after a delay imposed by the network comprising capacitor 33 and inductor 36. The resulting conduction of the buffing valve 35 gives rise to a negative-going voltage upon the anode 46. This voltage signal is delivered to the output line 28. With the removal of the positive signal from the control electrode 34, the buffing valve 35 resumes its normal nonconductive state.

A positive-going signal upon the impulse receiving terminal 11 is also immediately delivered to the inner control electrode 51 of the normally nonconducting gate valve 50; while a positive impulse upon the impulse-receiving terminal 12 is immediately delivered to the auxiliary control electrode 52 of this valve. The gating valve 50 remains nonconductive except when positive-going impulses are concurrently delivered from terminals 11 and 12. In this case, the gating valve 50 becomes conductive. The current surge resulting through the anode resistor 59 produces a negative voltage excursion upon the anode 57. This negative-going impulse is passed through the coupling capacitor 58 to the auxiliary control electrodes 18 and 38 respectively, of buffing valves 15 and 35. The valves 15 and 35 are prevented from becoming conductive by the negative signal upon their auxiliary control electrodes 18 and 38 even though positive signals appear upon their inner control electrodes 14 and 34 respectively. It is noted that the negative signal delivered to the auxiliary control electrodes 18 and 38 of buffing valves 15 and 35 arrives before positive signals are delivered to the inner control electrodes 14 and 34. This assures nonconductivity of the buffing valves 15 and 35. To further insure nonconductivity of the valves 15 and 35, the anode resistor 59 may have a high resistance which in combination with the series capacitance of the gating valve 50 forms a network having a relatively long time constant. Thus, when the positive signals are removed from the control electrodes 51 and 52 of the gating valve 50, the current flow through the anode resistor 59 decays slowly to prolong the duration of the negative signal upon the auxiliary control electrodes 18 and 38 of buffing valves 15 and 35.

The output line 28 connects through a coupling capacitor 62 with the control electrode 63 of a normally conducting signal input valve 64; the control electrode 63 is returned to ground potential by means of a grid resistor 65. The signal input valve 64 has its cathode 66 joined to ground and its anode 67 returned to positive bus 90 through an anode resistor 68.

A signal timing valve 69 is normally conducting. It has its cathode 71 linked to ground while its anode 72 is connected to a signal output line 73 through a coupling capacitor 61 and joined to anode 67 of signal input valve 64. The control electrode 74 of the signal timing valve 69 is returned to ground through a grid resistor 75 and is also joined to the signal output terminal of a clock pulse generator 76 through series connected inductor 77 and resistor 78. A capacitor 79 connects to ground from the junction of inductor 77 and resistor 78.

Signals appearing upon the signal output line 28 are delivered to the control electrode 63 of the signal input valve 64. Delivery of a negative impulse to the control electrode 63 renders the valve 64 nonconductive. However, the potential upon the anode 67 of valve 64 is not affected by its nonconductivity, as long as the signal timing valve 69 remains conductive. This is because current continues to flow through anode resistor 68 which is common to valves 64 and 69. When valve 69 is also rendered nonconductive by the delivery of a negative-going impulse to its control electrode 74, a positive-going impulse is delivered to the signal output line 73. This is because the current flow through anode resistor 68 is diminished and the voltage drop across it lowered by the concurrent nonconductivity of valves 64 and 69. When the signal timing valve 69 is nonconductive, the conductivity of the signal input valve 64 acts to prevent the delivery of positive-going signals to the signal output line 73.

The clock pulse generator 76 generates negative pulses at a repetition rate which is equal to the repetition rate of the signal arriving at impulse receiving terminals 11 and 12. The combination of capacitor 79 and inductor 77 acts to delay the arrival of a negative impulse from the clock pulse generator 76 to the control electrode 74 of the signal timing valve 69. The delay imposed is sufficient to allow a negative impulse to arrive first upon the control electrode 63 of the signal input valve 64 (if such signal is delivered from signal output line 28). Under such circumstances, the signal input valve 64 is extinguished first, and the signal timing valve 69 is made nonconductive thereafter with the arrival of the negative clock pulse. In this manner, the clock pulses time the delivery of positive signals to line 73 which results upon the concurrent nonconductivity of valves 64 and 69.

Signals upon the anode 57 of the gating valve 50 are also delivered to the auxiliary control electrode 81 of a signal input valve 82 through the coupling capacitor 86. Valve 82 has its cathode 83 and suppressor electrode 84 joined to ground and its screen electrode 85 linked to positive bus 70 and connected to ground through a coupling capacitor 86. The anode 87 of signal input valve 82 is returned to positive bus 90 through an anode resistor 88 and joined to a signal output line 89 through a coupling capacitor 91.

A signal input valve 82 is normally conducting and is associated with a normally conducting signal timing valve 95.

The signal timing valve 95 has its cathode 96 joined to ground and its anode 97 linked to the anode 87 of the signal input valve 82. The control electrode 98 of the signal timing valve 95 is also connected to the signal output terminal of the clock pulse generator 76 through an inductor 99 connected in series with the resistor 78. The control electrode 98 of valve 95 is also returned to ground through a grid resistor 101. A capacitor 102 is connected in parallel with the capacitor 79.

The operation of valves 82 and 95 is similar to the operation of valves 64 and 69 just described. A negative signal delivered to the auxiliary control electrode 81 of the signal input valve 82 from the anode 57 of gating valve 50 makes valve 82 nonconductive. A negative signal received thereafter by the control electrode 98 of the signal timing valve 95 makes valve 95 nonconductive. With both valves 82 and 95 nonconductive a positive-going impulse is delivered to the signal output line 89.

The signal output line 89 is connected to the input of a delay line 105 having an input resistor 106 connected to ground. The delay line 105 may comprise two series inductors 107 connected between the line 89 and a line 109, capacitors 110 connecting from the ends of the inductors 107 to ground potential. The delay line 105 imposes a delay on signals passing from line 89 to line 109 which is approximately one pulse period at the clock pulse repetition rate.

The portion of the impulse responsive circuit described thus far may be considered one stage of a two-stage network. The second stage is in many respects similar to the first stage. Therefore, in consideration of this portion of the apparatus the description of the first stage should be kept in mind. The signal output line 73, connects through a delay network 116 to the inner control electrode 114 of a signal buffing valve 115. Valve 115 is normally nonconducting. The signal output line 73 also connects directly to the inner control electrode 151 of a normally nonconducting gating valve 150. The line 109 connects through a delay network 136 to the inner control electrode 134 of a normally nonconducting buffing valve 135. Line 109 is also directly connected to the auxiliary control electrode 152 of the gating valve 150. The anodes 126 and 146 respectively of buffing valves 115 and 135 are returned to the plus 90 bus through an anode resistor 127 and connect to a signal output line 128. The anode 157 of the gating valve 150 returns to the positive bus 90 through an anode resistor 159 and connects by means of a coupling capacitor 158 to the auxiliary control electrodes 118 and 138, respectively, of the buffing valves 115 and 135; anode 157 also connects to the inner control electrode 80 of the signal input valve 82.

A positive impulse upon the signal output line 73 makes the buffing valve 115 conductive after a given delay to produce a negative signal upon the output line 128. Likewise, a positive-going impulse upon the signal output line 109 renders signal buffing valve 135 conductive after a given period, also producing a negative-going signal upon the output line 128. When positive-going impulses are concurrently present upon the signal output lines 73 and 109, the gating valve 150 becomes conductive, and produces a negative-going signal upon its anode 157. This signal is delivered to the auxiliary control electrodes 118 and 138, respectively, of valves 115 and 135 and prevents their conductivity. The negative-going impulse on the anode 157 of the gating valve 150 is also delivered to the inner control electrode 80 of the signal input valve 82 making this valve nonconductive. Thus, a negative-going signal upon the inner control electrode 80 makes the signal input valve 82 nonconductive as does a negative signal upon the auxiliary control electrode 81. As before, the appearance of a negative clock pulse on the electrode 98 of the signal timing valve 95 produces a positive-going signal upon the line 89.

The signal output line 128 is connected through a coupling capacitor 162 to the control electrode 163 of a signal input valve 164; the control electrode 163 is returned to ground through a grid resistor 165. The signal input valve 164 which is normally conductive has its cathode 166 returned to ground and its anode 167 joined to positive bus 90 through an anode resistor 168. The anode 167 of valve 164 is further connected to a signal output line 173.

A normally conducting signal timing valve 169, associated with the signal input valve 164, has its anode 172 linked to anode 167 of valve 164 and its cathode 171 grounded. The control electrode 174 of the signal timing valve 169 is returned to ground through a grid resistor 175 and connected with the signal output terminal of the clock pulse generator 76 through an inductor 177 connected in series with a resistor 178. The junction of conductor 177 and resistor 178 is returned to ground through a capacitor 179. The control electrode 174 of valve 169 is also joined to the cathode of a crystal diode 181. The anode of crystal diode 181 is returned to a negative bus 9 through a leading resistor 182 linked to a suppressing signal terminal 183.

Negative signals from the line 128 are delivered to the control electrode 163 of the normally conducting signal input valve 164 to make this valve nonconducting. A negative clock pulse thereafter received by the control electrode 174 of valve 169 drives valve 169 to cut off, and produces a positive output impulse over line 173.

The crystal diode 181 is normally nonconducting; its anode being maintained at a potential more negative than the potential upon its cathode. With a positive signal upon the signal terminal 183, crystal diode 181 becomes conductive to deliver a positive potential to the control electrode 174 of the signal timing valve 169. In this manner, negative clock pulses arriving from the generator 76 are suppressed. The signal timing valve 169 remains conducting. Under such circumstances even though a negative-going impulse delivered to the control electrode 163 of the signal input valve 164 causes nonconductivity, the signal output line 173 will not be driven positive.

The signal output line 173 is also joined to the control electrode 186 of inverter valve 187 through a coupling capacitor 188; the control electrode 186 is negatively biased by its return to the negative bus 21 through a grid resistor 189. The signal inverting valve 187 is normally nonconducting; it has its cathode 190 grounded and its anode 191 returned to positive bus 90 through an anode resistor 192. The anode 191 is also linked to a signal output line 193.

Positive-going impulses from signal output line 173 are delivered to the signal inverter valve 187 producing a current surge in its anode circuit. This develops a negative signal impulse which is delivered to the signal output line 193.

Consideration is now had of the overall operation of the impulse responsive circuit shown in Figure 1. Upon the arrival of a positive impulse on the impulse-receiving terminal 11, when no impulse is received by the impulse-receiving terminal 12, buffing valve 15 is made conductive producing a negative-going signal upon the output line 28. This negative signal from the output line 28 is delivered to the control electrode 63 of the input valve 64 making it nonconductive. The arrival of a negative clock pulse upon the control electrode 74 of the signal timing valve 69 makes it nonconductive also developing a timed positive-going signal upon the signal output line 73.

In the absence of a signal on the output line 109, delivery of a negative impulse to the inner control electrode 114 of the buffing valve 115 from the signal output line 73 produces a negative-going signal upon the line 128. This negative signal is delivered to the control electrode 163 of signal input valve 164 making it nonconductive. A positive-going impulse is delivered to the output line 173 when the signal timing valve 169 becomes nonconductive in response to a negative clock pulse upon its control electrode 174. The signal inverting valve 187 produces a negative output signal from the positive signal developed on the output line 173.

In the absence of a positive impulse upon the terminal 11, the arrival of a positive impulse upon the impulse-receiving terminal 12, in a similar manner, results in the conduction of the buffing valve 35 to produce a negative-going signal upon the output line 28 which is received by valve 64. As before, with the input valve 64 made non-conducting, the cutoff of timing valve 69 develops a positive signal which is delivered to the signal buffing valve 115. Valve 115 becomes conductive delivering a negative signal to the input valve 164. Valve 164 is now cut off to develop a positive output signal on the line 173 when signal timing valve 169 is cut off.

If a positive impulse is delivered to the impulse receiving terminal 11 at the same time a positive impulse is delivered to the impulse receiving terminal 12, the gating valve 50 is made conducting to prevent the delivery of a signal to the output line 28. However, a negative impulse is delivered to the auxiliary control electrode 81 of the signal input valve 82, driving it to cut off. A positive timed impulse is developed upon the line 89 under the cutoff of the signal timing line 95 with its receipt of a negative clock pulse. The delay line 105 receiving the positive impulse over line 89 delivers this signal to the output line 109 after a delay of about one pulse period. In other words, the delay imposed by the line 105 is such that a signal is delivered to the line 109 at the time when the next following clock pulse arrives upon the control electrode 74, 98 of signal timing valve 69, 95. This assures the simultaneous arrival of signals appearing concurrently upon the signal output lines 73 and 109.

The case has already been considered in which a signal output appears upon the line 73 in the absence of a signal upon the line 109. When a signal arrives upon the line 109 in the absence of a signal upon the output line 73, the buffing valve 135 is made conductive developing a negative-going signal upon the line 128. The negative signal from line 128 cuts off the signal input valve 164, so that when the signal timing valve 169 is made nonconductive by the receipt of a negative clocking pulse, a positive-going impulse is produced upon the output line 173.

In a case where positive output signals are delivered over both lines 73 and 109 at the same time, the gating valve 150 is caused to conduct preventing the development of a negative-going signal upon the line 128 and delivering a negative impulse to the inner control electrode 80 of the signal input valve 82. The signal input valve 82 is thereby made nonconducting. The arrival of a clock pulse cuts off the timing valve 95. This develops a positive-going impulse on line 89 which is passed through the delay line 105 to arrive upon the line 109 one pulse period later. If a signal also arrives upon the line 73, with the arrival of the impulse upon the line 109, the cycle of events just described is repeated. That is, a negative signal is delivered to the signal input valve 82 and a timed positive signal is passed through the delay line 105 from the line 89 to the line 109.

When the cycle of events just described is to be repeated many times, a great advantage derived from the use of signal timing valve 95 is that a slight timing error is not increased with each cycle. This is so because the signal arriving at the signal input valve 82 is retimed for each of said cycles.

It should be noted that negative impulses upon both the inner control electrode 80 and the auxiliary control electrode 81 of the signal input valve 82 cannot appear at the same time. This will become clear by considering that it is necessary that concurrent positive impulses appear upon both the impulse-receiving terminals 11 and 12 for the delivery of a negative impulse to the auxiliary control electrode 81 of the signal input valve 82. In this event, a negative signal is not developed upon the output line 28 resulting in the absence of a positive signal upon the line 73. However, if a negative impulse is to be delivered to the inner control electrode 80 of the signal input valve 82, a positive signal upon the line 73 is required as well as a concurrent signal upon the output line 109. Thus, when a negative signal is delivered to the auxiliary control electrode 81, the delivery of a negative impulse to the inner control electrode 80 of valve 82 is not possible.

Referring now to Figure 2, together with the circuit shown in Figure 1, a clock pulse is generated upon the initiation of each pulse position. A positive impulse arriving at terminal 11, at impulse position 1, is delivered to the input of buffing valve 15 after a given delay. Because a positive impulse does not appear upon the terminal 12, during impulse position 1, a positive signal is delivered to the output line 73. This signal is timed by the arrival of a delayed clock pulse at the input of the timing valve 69.

After being delayed, the signal upon line 73 arrives upon the input of the buffing valve 115. With the absence of an input signal to the buffing valve 135 between pulse positions 1 and 2, a positive signal is delivered over the output line 173, being timed by the arrival of a properly delayed input clock signal at the timing valve 169.

The arrival of impulses on both terminals 11 and 12 at impulse position 2 produces an output impulse from gating valve 50 which prevents the delivery of a signal to line 73.

However, an impulse is produced upon the line 89 after being timed by the arrival of a properly delayed clock pulse at the input of timing valve 95. The impulse signal upon line 89 is delivered to the input of the buffing valve 135 after a delay of approximately one pulse period.

The arrival of a positive impulse upon the terminal 12, at impulse position 3, results in the delivery of a positive impulse to the line 73. In this instance, the receipt of input signals by the gating valve 150 upon both its input electrodes produces an output signal preventing the delivery of an impulse to the line 173 while delivering a signal to line 89.

A positive impulse arrives upon terminal 12 at impulse position 4, effecting delivery of a positive signal upon line 73. An output signal is developed by the gating valve 150 during pulse position 4. This results from the delivery at this time of signals upon both input electrodes of valve 150. One electrode of valve 150 receives the signal on line 73 while the other electrode receives the signal appearing previously (during pulse position 3) upon line 89. This output signal of gating valve 150 prevents a signal output upon line 173 during impulse position 4, and effects delivery of an impulse signal to line 89.

At impulse position 5, the arrival of a positive impulse upon the terminal 11 also delivers a positive impulse to the lines 73. An output signal is again delivered in pulse position 5 by gating valve 150 because of the receipt of signals upon both its input electrodes. This results in no signal pulse being received by the output line 173 in pulse position 5 while the signal is delivered to line 89.

An impulse does not arrive upon either terminal 11 or 13 during pulse position 6. However, in pulse position 6, a signal is delivered to the input of buffing valve 135. This signal is derived, after being suitably delayed by delay line 105, from the signal appearing upon line 89 during pulse position 5. The output signal from buffing valve 135 is timed by valve 169 which produces in pulse position 6, an output signal upon line 173.

In pulse position 7, the absence of impulses upon the terminals 11 and 12 is accompanied by the absence of an output impulse upon the line 173.

The presence of impulses upon both terminals 11 and 12 in pulse position 8 results in the delivery of a positive impulse to the line 89. No signal impulse is delivered to the line 173 in this pulse position. The presence of signal impulses upon the terminals 11 and 12 in pulse position 9 likewise produces a signal upon line 89. However, an impulse is delivered upon the line 173. This is because an input signal is received by the gating valve 135 derived from line 89 after a pulse period delay.

In pulse position 10, the arrival of a signal upon terminal 12 results in delivery of a signal to the line 73. In this case an output signal is delivered by the gating valve 150 because of the receipt of signals from line 73 as well as from line 89. The output signal from gating valve 150 prevents the delivery of a signal to the line 173 and effects the delivery of a signal to line 89.

The presence of an impulse upon terminal 11 in pulse position 11 results in a signal being delivered to line 73. An output signal is delivered by gating valve 150 because as in the previous case, input signals are derived from lines 89 and 73.

In pulse position 12, no signals are received by the terminals 11 and 12. However, an input signal is delivered to the buffing valve 135 from line 89 after being subject to a one-pulse position delay. The output signal from the buffing valve 135 in the presence of a clock pulse input to the timing valve 169 produces an impulse signal upon the line 173. However, in this instance, the clock input signal to the timing valve 169 is suppressed, thus preventing delivery of an impulse signal to line 173. As previously noted, the presence of a positive signal upon the terminal 183 (Figure 1) acts to suppress the delivery of clock signals to the signal timing valve 169.

Pulse positions 13 and 14 clearly illustrate that the arrival of positive impulse upon both terminals 11 and 12 in pulse position 13 with the absence of impulses arriving at pulse position 14 results in the delivery of an impulse to line 173 in pulse position 14.

From the above description it may be observed that the output signals delivered upon the line 173 are determined by the sequence or series of impulses delivered upon the terminals 11 and 12. With given combinations of impulses upon terminals 11 and 12, corresponding responses are obtained comprising unique impulse combinations in time ordered patterns. The impulse responsive apparatus here described may be adapted for various uses by those skilled in the art.

It may also be noted that the circuit shown in Figure 1 may be used to add binary numbers. For example, each impulse arriving upon the terminals 11 and 12 may be considered to represent the numeral 1 (one) while the absence of an impulse in a pulse position can be used to represent the numeral 0 (zero). For this example, consider pulse positions 1 through 7 (Figure 2). The least significant figure appears in pulse position 1. Thus the signal impulse train arriving upon terminal 11 represents the binary number 0010011. The signal input train correspondingly arriving at terminal 12 represents the binary number 0001110. The output response train arriving upon line 173 for the said first seven pulse positions, the least significant figure being represented in pulse position 1, corresponds to the binary number 0100001. Thus, it is evident that signal trains upon terminals 11 and 12 representing binary numbers cause the apparatus to produce an output signal train representing their binary sum.

Consideration is now had of some modes of individually utilizing the first stage portion of the impulse responsive circuit shown in Figure 1, comprising buffing valve 15, buffing valve 35, gating valve 50, signal input valve 64, signal timing valve 69, signal input valve 82, (only one input electrode needed now), and signal timing valve 95.

It is apparent that this circuit provides a device with two signal output lines, namely, line 73 and line 89. If a positive impulse is received upon either of the terminals 11 or 12, but not both, then a signal impulse is delivered over the line 73. If positive impulses are received by terminals 11 and 12 at the same time, then an output signal is delivered over the line 89.

This circuit also provides a statically responsive network when one output lead is directly connected to the anodes of buffing valves 15 and 35, and the other output lead is directly connected to the anode of gating valve 50. In this case, the duration of output signals corresponds to the duration of input signals.

The circuit now under consideration may be utilized for comparing input impulses. For example, like-unlike comparison of signal trains concurrently arriving upon terminals 11 and 12 respectively provides the following results. If comparison of these arriving is identical, no output is delivered on the line 73 while signals are delivered to line 89. When the signals are presented to either line 11 or 12 and none arrives upon the other, the circuit produces an unlike response by delivering a signal to the line 73, while no signal is delivered to line 89. This comparison circuit may be utilized to sound an alarm or shut down equipment when an unlike response by the circuit indicates malfunctioning of equipment delivering signals to this circuit.

Another mode of operation and utilization of the first stage portion of the circuit shown in Figure 1 is to invert signal impulses presented to one of the input terminals 11, 12. For example, if signal impulses delivered to terminal 11 are to be inverted and delivered over output line 73, an impulse signal train characterized by a repetition rate substantially identical with that of the signal delivered to terminal 11 and having an impulse present in each impulse position is delivered to terminal 12. It is thus apparent that when an impulse is delivered upon terminal 11 an impulse will be received by terminal 12, and no signal will be delivered to the output line 73. However, when an impulse is not delivered to terminal 11 in a predetermined impulse position, the impulse which is present upon terminal 12, results in an output signal upon the line 73. Thus, for each impulse arriving upon terminal 11 no impulse is delivered to line 73, while with the absence of an impulse in a given pulse position upon terminal 11, an impulse is delivered over the output line 73. This effectively results in inverting a signal train arriving on the terminal 11, that is, presenting an impulse where one was originally absent and removing an impulse where one was originally present.

This inverting process is especially useful in means employed for binary computation. When a signal is so inverted and used in binary computation it is usually designated as the ones complement.

Referring now to Figure 3 which shows a modified impulse responsive circuit, an impulse receiving terminal 201 is connected to the control electrode 202 of a buffing valve 203. The control electrode 202 of the valve 203 is negatively biased by returning through a grid resistor 204 to a negative bus 21. The buffing valve 203 which is normally nonconductive has its cathode 205 returned to ground potential and its anode 206 joined to a positive bus 92 through an anode resistor 206.

An impulse receiving terminal 211 is joined to the control electrode 212 of a buffing valve 213. The control electrode 212 of buffing valve 213 is negatively biased by its return to the negative bus 21 through a grid resistor 214. The buffing valve 213 which is normally non-conducting has its cathode 215 returned to ground potential and its anode 216 linked to the anode 206 of the buffing valve 203.

The impulse receiving terminal 201 is also joined to the inner control electrode 219 of a signal gating valve 220, auxiliary controlled electrode 221 of this valve. The signal buffing valve 220 which is normally non-conductive has its suppressor electrode 222 and cathode 223 linked to ground potential, its screen electrode 224 joined to a positive bus 70 and by-passed to ground through a capacitor 225, and its anode 226 returned to the positive bus 90 through an anode resistor 227.

The anodes 206 and 216, respectively of buffing valves 203 and 213, connect with the control electrode 229 of a signal input valve 230 through a series connected coupling capacitor 231 and an inductor 232. The control electrode end of inductor 232 is connected to ground through a grid resistor 233, while its other end is joined to ground by an input capacitor 234. The signal input valve 230 which is normally conducting has its cathode 235 grounded and its anode 236 joined to positive bus 90 by means of an anode resistor 237. The anode 236 of valve 230 is also linked to the anode 226 of the gating valve 220 by means of a coupling capacitor 238.

A signal timing valve 240 associated with the signal input valve 230 has its control electrode 241 connected with a clock pulse terminal 242 through an inductor 243. The control electrode end of inductor 243 is returned to ground through a grid resistor 244 while its other end is passed to ground through an input capacitor 245. The signal timing valve 240 which is normally conducting has its cathode 246 linked to ground and its anode 247 joined to the anode 236 of the signal input valve 230. Anode 247 of valve 240 is further coupled to a signal line 250 by means of a coupling capacitor 249.

The impulse receiving terminal 201 may receive impulse trains having a given repetition rate and which are characterized by the presence or absence of a positive-going impulse in given impulse positions. Likewise, terminal 211 may receive an impulse train of the same repetition rates also characterized by the absence or presence of a positive-going impulse in given impulse positions. The presence of a positive impulse upon terminal 201 makes buffing valve 203 conductive to produce a negative-going signal in its anode circuit. This negative-going signal is delivered to the control electrode 229 of the signal input valve 230 to make it nonconductive. In a similar manner, a positive-going signal upon the terminal 211 renders buffing valve 213 conductive to develop a negative-going signal in this anode circuit. This negative signal likewise drives the signal input valve 230 to cutoff. When the signal receiving valve 230 is nonconductive due to the presence of a positive-going impulse upon one of the terminals 201 or 211, cutoff of signal timing valve 240 causes delivery of a positive-going signal to the output line 250. The signal timing valve 240 is cut off by each negative clock pulse that arrives from terminal 242. The clock pulse repetition rates is the same as the repetition rate of the signal trains delivered to terminals 201 and 211.

When positive impulses are received by terminal 201 and 211 at the same time, the positive swing of electrodes 219 and 221 renders the signal gating valve 220 conductive. Upon conduction, a negative signal is developed upon the anode 226 of valve 220. This negative signal is delivered to the anodes 236 and 247, respectively, of valves 230 and 240, to prevent their positive excursion, thereby inhibiting the delivery of a positive-going signal to the line 250. This suppression of an output signal on line 250 is assured by the inductor 232 and capacitor 234 which delay the delivery of the negative-going impulse from the buffing valves 203 and 213 to the control electrode 229 of the signal input valve 230. This allows the prior arrival of the suppressing signal. Furthermore, the suppressing signal delivered by the gating valve 220 may be prolonged so that it remains present until after the negative signal has been removed from the control electrode 229 of input valve 230. This prolonged signal may easily be obtained as follows: Make the resistance of the anode resistor 227 sufficiently high so that its combination in series with the capacitance of the gating valve 220 forms a network having a relatively long time constant.

The clock pulses on terminal 242 are delayed by the combination of inductor 243 and capacitor 245 before reaching the input electrode 241 of timing valve 240. The clock pulse is delivered to the input of valve 240 after the input signal is received by valve 230 in order to time the signal output to line 250.

The anode 226 of the signal gating valve 220 is also coupled to the auxiliary control electrode 253 of a signal input valve 254 by means of a coupling capacitor 255. The electrode 253 is also returned to ground through a grid resistor 252. The input valve 254 which is normally conducting has its suppressor electrode 256 and cathode 257 directly linked to ground, its screen electrode 258 joined to positive bus 70 and returned to ground through by-pass capacitor 259, and its anode 260 returned to positive bus 90 by means of an anode resistor 261.

A normally conducting signal timing valve 262 is associated with the signal input valve 254. The control electrode 263 of the signal input valve 262 receives negative clock pulses from the terminal 242 through a delay network comprising an inductor 264 and an input capacitor 265. The said control electrode 263 also is returned to ground by means of a grid resistor 266. The cathode 267 of valve 262 is grounded while the anode 268 is linked to anode 260 of valve 254 and joined to a signal line 269 through a coupling capacitor 270.

A negative-going impulse developed in the anode circuit of gating valve 220 is also delivered to the auxiliary control electrode 253 of signal input valve 254 to make it nonconductive. Shortly thereafter, the signal timing valve 262 receives a negative clock pulse cutting it off. This results in the delivery of a positive-going signal to the line 269.

The signal line 269 is connected to the input of the delay line 271. Delay line 271 comprises series inductors 272, an input resistor 273 bridging the input end to ground, an output resistor 275 bridging the output end to ground, and delay capacitors each connecting an inductor end to ground. The output of delay line 271 connects to the signal line 276 through a coupling capacitor 277.

The delay line 271 passes signals appearing on line 269 to line 276 and imposes a delay of approximately one pulse-period at said given repetition rates.

Thus, if a positive impulse arrives at the terminal 201, a positive impulse will be delivered to the line 250. If a positive impulse arrives upon the terminal 211, a positive impulse also is delivered to the line 250. If, however, positive impulses appear on the terminals 201 and 211 at the same time, an impulse will not be delivered to the line 250. However, a positive impulse will be delivered to the line 276, one pulse period later.

The portion of the impulse responsive circuit described thus far may be considered one stage of a two-stage network. The second stage is in many respects similar to the first stage. The signal line 250 is joined to the control electrode 302 and the buffing valve 303 and to the inner control electrode 319 of a signal gating valve 320. The signal line 276 is joined to the control electrode 312 of a buffing valve 313 and to the auxiliary control electrode 321 of the signal gating valve 320. The anodes of buffing valves 303 and 313 are returned to the positive bus 90 through an anode resistor 307 and are linked to the control electrode of a signal input valve 330 through a delay network 332.

The signal gating valve 320 has its anode 326 returned to positive bus 90 through an anode resistor 327 and linked with the anode of the signal input valve 330 through a coupling capacitor 338. Anode 326 of the signal gating valve 320 is also linked to the inner control electrode 353 of the signal input valve 254 by means of a coupling capacitor 355. The control electrode 353 is returned to ground through a grid resistor 352.

A signal timing valve 340 associated with the signal input valve 330 receives negative clock pulses upon its control electrode from the terminal 242 through a delay network 343. The anodes of valves 330 and 340 are returned to a positive bus 90 through an anode resistor 337 and are joined to a signal output line 350.

The operation of valves 303, 313, 320, 330 and 340 are respectively similar to the operation of valves 203, 213, 220, 230, and 240, previously described. Thus, when a positive-going impulse arrives upon the line 250 a positive impulse is delivered to the line 350. When a positive impulse arrives upon the line 276, a positive-going impulse is also delivered to the line 350. When positive impulses arrive upon the lines 250 and 276 at the same time, a positive impulse is not delivered to the line 350, however, a positive impulse is delivered to the inner control electrode 353 of the signal input valve 254. This results in a positive impulse upon line 276 after a delay of approximately one impulse period. Negative impulses cannot be received at the same time by both control electrodes 353 and 253 of the signal input valve 254 for reasons already explained in connection with Figure 1.

A signal inverting valve 360 has its control electrode 361 joined to the signal output line 350 by means of a resistor 362. The said control electrode 361 is negatively biased by returning to the negative bus 301 through a grid resistor 363. The cathode 364 of the signal inverting valve 360 is grounded, and the anode 364 is returned to positive bus 90 through an anode resistor 366 and is also linked to a signal output line 367.

Thus, the signal inverting valve 360 which is normally nonconducting becomes conductive upon the appearance of a positive-going impulse upon the signal output line 350 to deliver a negative impulse upon the output line 367.

If like sets of impulse trains are delivered to the respective impulse receiving terminals of the impulse responsive circuits shown in Figures 1 and 3, these circuits will deliver output signals having similar time ordered impulse patterns.

The first stage portion of the impulse responsive circuit shown in Figure 3 may be employed as previously described for the utilization of the first stage portion of the circuit shown in Figure 1. In this case, the circuit may comprise buffing valve 203, buffing valve 213, gating valve 220, signal input valve 230, signal timing valve 240, signal input valve 254, and signal timing valve 262. This provides the circuit with two signal output lines, namely, lines 250 and 276. The output response of this circuit to input signals is similar to that of the corresponding portion of the responsive circuit shown in Figure 1.

The impulse responsive circuit shown in Figure 4 is adapted to receive trains of negative-going impulses upon its impulse receiving terminals 401 and 402. This impulse trains which arrive upon terminals 401 and 402 have the same repetition rate and are characterized by the presence or absence of a negative impulse in given pulse positions.

Terminal 401 is connected to ground through a grid resistor 403 and joined to the inner control electrode 404 of signal buffing valve 405. The impulse receiving terminal 402 is also returned to ground through a grid resistor 406 and joined to the auxiliary electrode 407 of the buffing valve 405. The signal buffing valve 405 which is normally conducting has its suppressor electrode 410 linked to a positive bus 70 and returned to ground through a by-pass capacitor 411. The anode 412 of valve 405 returns to a positive bus 90 through an anode resistor 413 and is also connected to the control electrode 416 of a signal inverting valve 417 by means of a coupling capacitor 414 through a delay network 415. The delay network 415 comprises an inductor and an input capacitor 417 bridged to ground from the input end of said inductor.

The inverting valve 417 which is normally nonconducting has its control electrode negatively biased by returning to a negative bus 9, and its cathode grounded. The anode of inverting valve 417 connects to positive bus 90 through an anode resistor 419, and is also joined to a signal line 421 by means of a coupling capacitor 420.

The arrival of negative impulse upon either one of the impulse receiving terminals 401 and 402 renders the signal buffing valve 405 nonconductive to develop a positive voltage excursion upon the anode 412. This positive impulse is delivered to the control electrode of inverting valve 417 which becomes conductive and delivers a negative-going impulse to the signal line 421. The signal input terminals 401 and 402 are also connected respectively to the control electrodes 420 and 421 of a pair of parallel connected gating valves 422 and 432. The gating valves 422 and 432 which are normally conducting have their cathodes 423, 433, grounded and their anodes 424, 434 returned to positive bus 90 through an anode resistor 435.

A normally nonconducting signal inverting valve 438 has its control electrode 439 joined to the anodes 424, 434 of the gating valves 422 and 432 by means of a coupling resistor 440. The control electrode 439 of valve 438 is negatively biased by returning to negative bus 301 through a grid resistor 441.

The cathode of signal inverting valve 438 is grounded, while the anode 442 is linked to positive bus 90 through an anode resistor 443 and joined to the control electrode 417 of inverting valve 417 by means of a coupling capacitor 444.

If negative signal impulses do not arrive upon both of the terminals 401 and 402 at the same time, at least one of the gating valves 422, 432 remains conductive. This prevents a positive voltage excursion of the anodes 424 and 434 of valves 422 and 432. However, when negative impulses arrive upon both of the terminals 401 and 402 at the same time, both gating valves 422 and 432 are concurrently cut off to produce a positive-going voltage excursion upon their anodes 424, 434.

The delivery of a positive-going impulse to the control electrode 439 of inverting valve 438 produces a current surge in the anode circuit of this valve. The resulting negative voltage excursion upon anode 442 of the signal inverting valve 438 is delivered to the control electrode 416 of inverting valve 417. This prevents the positive excursion of control electrode 416 due to delivery of a positive impulse from the output of the buffing valve 405. The delay network 415 assures the suppression of the positive impulse to valve 417 from buffing valve 405 by delaying its delivery until after a negative impulse has arrived at valve 417 from inverting valve 438. Furthermore, the duration of the negative suppressing impulse from valve 438 is prolonged by making the value of the anode resistor 443 sufficiently high. Thus, the negative suppressing impulse delivered to valve 417 will not be removed therefrom until after the removal of the positive impulse delivered from valve 405. All this prevents the delivery of a negative impulse to the signal line 421.

The anodes 424 and 434 respectively of signal gating valves 422 and 432 are also connected to the inner control electrode 448 of a signal input valve 450 by means of a coupling capacitor 451. Signal input valve 450 which is normally nonconducting has it inner control electrode 448 negatively biased by its return to negative bus 9 through a grid resistor 449. The suppressor electrode 452 and the cathode 453 of valve 450 are grounded, and the screen electrode 454 is linked to positive bus 70 and connected to ground through a bypass capacitor 455. The anode 456 of input valve 450 connects to positive bus 90 through an anode resistor 457 and is coupled to a signal line 461 through a delay line 458 by connecting to the input thereof.

The delay line 458 comprises a plurality of series connected inductors 459, an input resistor 462 bridging to ground the input end of said inductors 459, and a plurality of capacitors 460 each connecting the end of an inductor 459 to ground. The output end of delay line 458 connects to signal line 461.

When both gating valves 422 and 432 become nonconductive at the same time, a positive-going signal developed upon their anodes 424 and 434 is delivered to the inner control electrode 448 of signal input valve 450. The valve 450 becomes conductive producing a negative-going signal upon its anode 456. This negative signal is delivered to the signal line 461 after a delay of approximately one pulse period at the given repetition rate. This delay is imposed by the delay line 458.

Thus, if a negative impulse is delivered to either of the impulse receiving terminals 401, 402 but not to both, a negative impulse is delivered to the signal line 421. If negative impulses arrive upon both impulse-receiving terminals 401 and 402 at the same time, a signal is not delivered to line 421, however, a negative impulse is delivered to the signal line 461 after a one impulse period delay.

The portion of the impulse responsive circuit shown in Figure 4 thus far described can be considered to be one stage of a two-stage network. The second stage to be described now is in many respects similar to the first stage. The signal line 421 connects to the inner control electrode 504 of a signal buffing valve 505 and to the control electrode 520 of a signal gating valve 522. The signal line 461 is joined to the auxiliary control electrode 507 of the buffing valve 505 and connects to the control electrode 521 of the signal gating valve 532.

The signal buffing valve 505, which is normally conducting, has its anode returned to the positive bus 90 through an anode resistor 513 and linked to a signal output terminal 550 by means of a coupling capacitor 514 through a delay network 515.

The output end of the delay network 515 also connects to the control electrode 516 of a normally nonconducting signal inverting valve 517. The control electrode 516 is negatively biased by returning to negative bus 9 through grid resistor 518. The inverting valve 517 has its anode joined to positive bus 90 through an anode resistor 519 and linked to signal output terminal 521 through a coupling capacitor 520.

The normally conducting gating valves 522 and 532 have their anodes returned through an anode resistor 535 to positive bus 90 and linked to the control electrode 539 of a signal inverting valve 538 through a coupling resistor 540. The control electrode 539 of the normally nonconducting inverting valve 538 is negatively biased by returning through a grid resistor 541 to negative bus 301; the anode of valve 538 is returned to positive bus 90 through an anode resistor 543 and joined to the input electrode 516 of the signal inverting valve 517.

The anodes of signal gating valves 522 and 532 are further connected to the inner control electrode 548 of the signal input valve 550 by means of a coupling capacitor 551. The inner control electrode 548 of valve 450 is negatively biased by returning to negative bus 9 through a grid resistor 549. A positive impulse upon either of the control electrodes 548, 448 of signal input valve 450 is sufficient to render this valve conductive.

The operation of valves 505, 517, 522, 532, and 538 are respectively similar to the operation of the valves 405, 417, 422, 432, and 438, previously described. Thus, when a negative impulse arrives upon the signal line 421, a positive impulse is delivered to the output terminal 550, while a negative impulse is delivered to the output terminal 521. When a negative impulse arrives upon the signal line 461, a positive impulse is likewise delivered to terminal 550, while a negative impulse is delivered to terminal 521. When negative impulses arrive upon the signal lines 421 and 461 at the same time, signals are not delivered to the output terminals 550 and 521, however, a negative impulse is delivered to the inner control electrode 548 of the signal input valve 450. This results in a negative impulse upon line 461 after a delay of approximately one pulse period. Positive impulses cannot be received at the same time by both control electrodes 548 and 448, of the signal input valve 450, for reasons already explained in connection with Figure 1.

The impulse response of the circuit shown in Figure 4 to sets of impulse trains, is similar to that of the impulse responsive circuits shown in Figures 1 and 4.

The first stage portion of the circuit shown in Figure 4 may be utilized as previously described for the first stages of the impulse responsive circuits shown in Figures 1 and 3. This circuit may be provided with two signal output lines, namely lines 421 and 461. The output response of the circuit to input impulse signals is similar to that of the first stage portions of the responsive circuits shown in Figures 1 and 3.

While only a few representative embodiments of apparatus for practising the inventions disclosed herein have been outlined in detail, there will be obvious to those skilled in the art, many modifications and variations accomplishing the foregoing objects and realizing many or all of the advantages, but which yet do not depart essentially from the spirit of the invention.

What is claimed is:

1. In an impulse responsive network, a first circuit comprising first and second input conductors adapted to receive stimuli and first and second output conductors, said first output conductor being energized upon the occurrence of stimuli on only one of said input conductors, said second output conductor being energized at a predetermined time after the concurrence of stimuli upon both of said input conductors, and a second circuit comprising first and second input conductors adapted to receive stimuli respectively connecting with the first and second output conductors of said first circuit and first and second output conductors, said first output conductor being energized upon the occurrence of stimuli on only one of said input conductors, said second output conductor energizing the second input conductor of said second circuit at a predetermined time after the concurrence of stimuli upon both of the input conductors of said second circuit.

2. In an impulse responsive network, a first circuit comprising first and second input conductors adapted to receive stimuli and first and second output conductors, said first output conductor being energized upon the occurrence of stimuli on only one of said input conductors, said second output conductor being energized upon the concurrence of stimuli upon both of said input conductors, a delay element having an input lead operatively connecting with the second output conductor of said first circuit and an output lead, and a second circuit comprising first and second input conductors adapted to receive stimuli respectively connecting with the first output conductor of said first circuit and the output lead of said delay element and first and second output conductors, said first output conductor being energized upon the occurrence of stimuli on only one of said input conductors, said second output conductor energizing the input lead of said delay element upon the concurrence of stimuli on both of the input conductors of said second circuit.

3. In an impulse responsive network, a first circuit comprising first and second input conductors adapted to receive stimuli and first and second output conductors, said first output conductor being energized upon the occurrence of stimuli on only one of said input conductors, said second output conductor being energized at a predetermined time after the concurrence of stimuli upon both of said input conductors, a second circuit comprising first and second input conductors adapted to receive stimuli and first and second output conductors, said first output conductor being energized upon the occurrence of stimuli on only one of said input conductors, said second output conductor being energized at a predetermined time after the concurrence of stimuli upon both of said input conductors, a first gating connection conditionally passing stimuli on the first output conductor of said first circuit to the first input conductor of said second circuit, stimuli on the second output conductors of said first and second circuits being conditionally passed to the second input conductor of said second circuit, a signal line, and a second gating connection conditionally passing stimuli on the first output line of said second circuit to said signal line.

4. In an impulse responsive network, a first circuit comprising first and second input conductors adapted to receive stimuli and first and second output conductors, said first output conductor being energized upon the occurrence of stimuli on only one of said input conductors, said second output conductor being energized upon the concurrence of stimuli upon both of said input conductors, a second circuit comprising first and second input conductors adapted to receive stimuli and first and second output conductors, said first output conductor being energized upon the occurrence of stimuli on only one of said input conductors, said second output conductor being energized upon the concurrence of stimuli upon both of said input conductors, a delay element having an output lead operatively connecting with the second input conductor of said second circuit and an input lead, a first gating connection conditionally passing stimuli on the first output conductor of said first circuit to the first input conductor of said second circuit, stimuli on the second output conductors of said first and second circuits being conditionally passed to the input lead of said delay element, a signal line, and a second gating connection conditionally passing stimuli on the first output line of said second circuit to said signal line.

5. In combination, a first signal line, a second signal line, a first signal link, a second signal link, a first buffing connection between said first signal line and said first signal link, a second buffing connection between said second signal line and said first signal link, a first gating connection adapted to receive stimuli upon said first and second signal lines, said gating connection upon the concurrence of stimuli on said first and second signal lines energizing said second signal link and inhibiting stimulation of said first signal link, a delay element having an input lead operatively connecting with the second signal link and an output lead, a third signal link, a third buffing connection between said first signal link and said third signal link, a fourth buffing connection between the output lead of said delay element and said third signal link, a second gating connection adapted to receive stimuli over said first signal link and upon the output lead of said delay element, said gating connection upon the concurrence of stimuli on said first signal link and upon the output lead of said delay element energizing said second signal link and inhibiting stimulation of said third signal link.

6. In combination, a first signal line, a first buffing valve comprising a first control electrode a second control electrode and an output electrode, a first delay element connecting between said first signal line and the first control electrode of said first buffer valve, a second signal line, a second buffing valve comprising a first control electrode a second control electrode and an output electrode, a second delay element connecting between said second signal line and the first control electrode of said second buffing valve, a first signal link operatively connecting with the output electrodes of said first and second buffing valves, a second signal link, and a gating valve comprising a first control electrode connecting with said first signal line a second control electrode connecting with said second signal line and an output electrode coupled with the second control electrodes of said first and second buffing valves and with said second signal link, said gating valve upon the concurrence of stimuli upon said first and second signal lines energizing said second signal link and inhibiting stimulation of said first signal link.

7. In combination, a first signal line, a second signal line, a first buffing valve comprising a control electrode operatively connecting with said first signal line and an output electrode, a second buffing valve comprising a control electrode operatively connecting with said second signal line and an output electrode, a first signal link comprising an electrode structure including a control member and an output member, a delay element operatively connected between the output electrodes of said first and second buffing valves and the control member of said first signal link, a second signal link, a gating valve comprising a first control electrode connecting with said first signal line a second control electrode connecting with said second signal line and an output electrode connecting with the output member of said first signal link and with said second signal link, said gating valve upon the concurrence of stimuli upon said first and second signal lines energizing said second signal link and inhibiting stimuli upon the output member of said first signal link.

8. In combination, a first signal line, a second signal line, a first buffing connection having a pair of input elements respectively connecting with said first and second signal lines and an output element, a first coupling connection comprising an input member connecting with said first signal line and an output member, a second coupling connection comprising an input member connecting with said second signal line and an output member, a first inverting connection comprising an input member connecting with the output members of said first and second coupling connections and an output member connecting with the output element of said first buffing connection, a second buffing connection having a first input element connecting with the output element of said first buffing connection and an output element, a delay link comprising a first unilateral input conductor connecting with the output members of said first and second coupling connections an output conductor connecting with the second input element of said second buffing connection and a second unilateral input conductor, a third coupling connection comprising an input member connecting with the first input element of said second buffing connection and an output member, a fourth coupling connection comprising an input member connecting with the second input element of said second buffing connection and an output member, the output members of said third and fourth coupling connections connecting with the second unilateral input conductor of said delay link, and a second inverting connection comprising an input member connecting with the output members of said third and fourth coupling connections and an output member connecting with the output element of said second buffing connection.

9. In combination, a first signal line, a second signal line, a buffing connection having a pair of input elements respectively connecting with said first and second signal lines and an output element, a first coupling connection comprising an input member connecting with said first signal line and an output member, a second coupling connection comprising an input member connecting with said second signal line and an output member, an inverting connection comprising an input member connecting with the output members of said first and second coupling connections and an output member connecting with the output element of said buffing connection, and a transfer delay link having an input lead connected to the output members of said first and second coupling connections and an output lead.

10. In combination, a first signal line, a second signal line, a buffing connection having a pair of input elements respectively connecting with said first and second signal lines and an output element, a first coupling connection comprising an input member connecting with said first signal line and an output member, a second coupling connection comprising an input member connecting with said second signal line and an output member, and an inverting connection comprising an input member connecting with the output members of said first and second coupling connections and an output member connecting with the output element of said buffing connection.

11. In combination, a first signal line, a second signal line, a signal output line, a buffing valve comprising a first control electrode connecting with said first signal line a second control electrode connecting with said second signal line and an output electrode, a delay element connecting between the output electrode of said buffing valve and said signal output line, a first coupling valve comprising a control electrode connecting with said first signal line and an output electrode, a second coupling valve comprising a control electrode connecting with said second signal line and an output electrode, and a signal inverting valve comprising a control electrode connecting with the output electrodes of said first and second coupling valves and an output electrode coupled with said signal output line.

JOHN PRESPER ECKERT, Jr.
JOHN W. MAUCHLY.

REFERENCES CITED

The following references are of record in the file of this patent:

UNITED STATES PATENTS

| Number | Name | Date |
|---|---|---|
| 2,464,353 | Smith et al. | Mar. 15, 1949 |